(No Model.) 3 Sheets—Sheet 1.

H. B. COBB.
UNDERGROUND ELECTRIC WIRE CONDUIT.

No. 451,614. Patented May 5, 1891.

Witnesses:
Inventor:
Henry B. Cobb,
By Dyrenforth & Dyrenforth
Attys (No Model.) 3 Sheets—Sheet 2.
H. B. COBB.
UNDERGROUND ELECTRIC WIRE CONDUIT.
No. 451,614. Patented May 5, 1891.
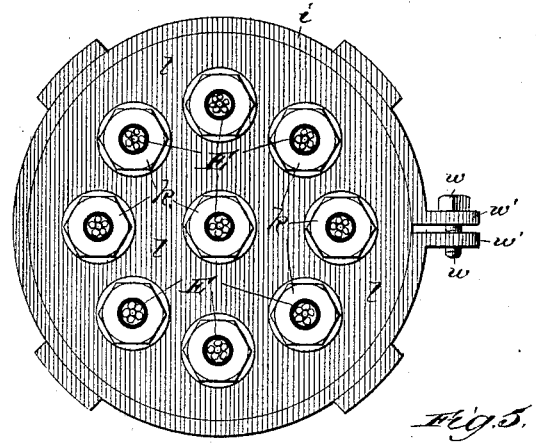
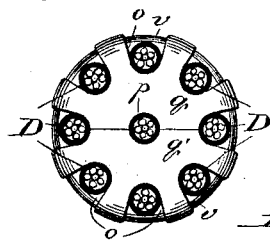
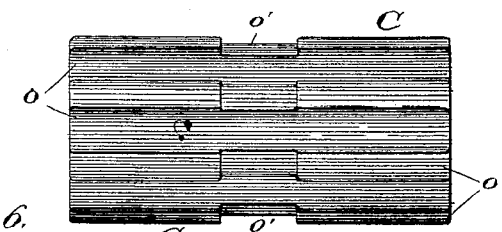
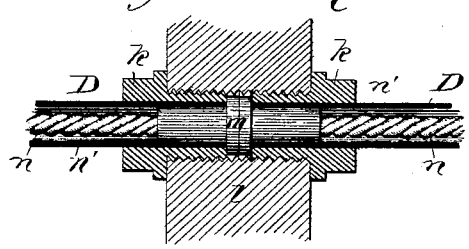
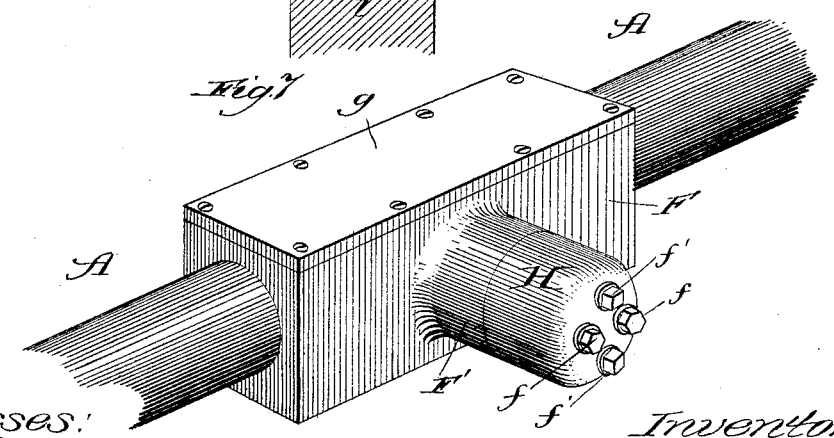
Witnesses:
Inventor:
Henry B. Cobb,
By Dyrenforth & Dyrenforth
Attys (No Model.) 3 Sheets—Sheet 3.
H. B. COBB.
UNDERGROUND ELECTRIC WIRE CONDUIT.
No. 451,614. Patented May 5, 1891.
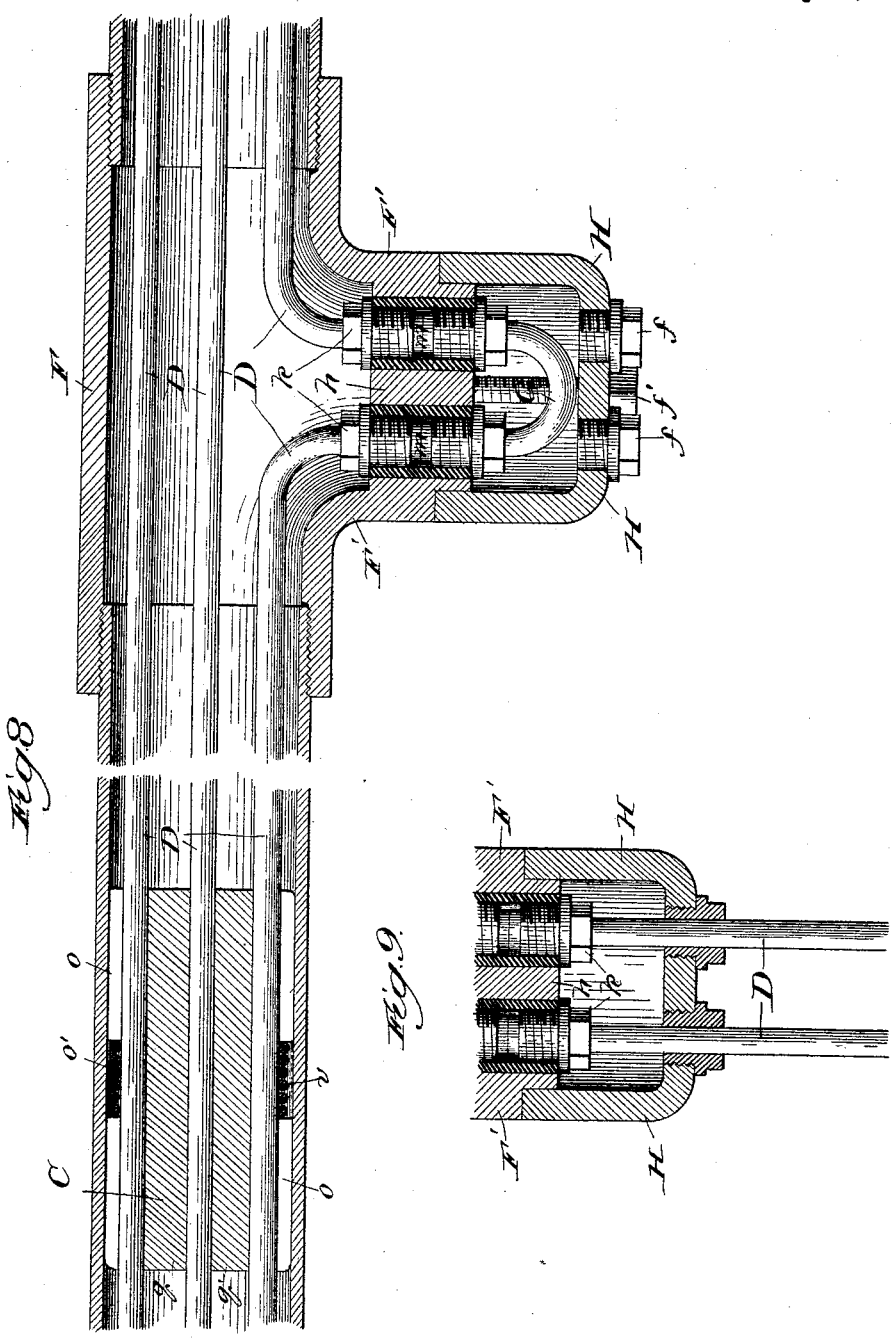

UNITED STATES PATENT OFFICE.

HENRY B. COBB, OF WILMINGTON, DELAWARE.

UNDERGROUND ELECTRIC-WIRE CONDUIT.

SPECIFICATION forming part of Letters Patent No. 451,614, dated May 5, 1891.

Application filed April 29, 1890. Serial No. 349,902. (No model.)

*To all whom it may concern:*

Be it known that I, HENRY B. COBB, a citizen of the United States, residing at Wilmington, in the county of New Castle and State of Delaware, have invented a new and useful Improvement in Underground Systems of Electric Wires, of which the following is a specification.

My invention relates to an improvement in means for laying the conductors in underground conduits in the form of pipes, such as are used for gas and water, and which are caused to extend in the streets from man-hole to man-hole, the same as other forms of conduits.

The objects of my invention are to provide means which shall greatly facilitate the operation of drawing the conductors into the pipe-conduits, and shall serve properly to support them therein, to provide means for readily producing house connections with the pipe-conduits, and to provide a generally improved underground electric system.

Figure 1:
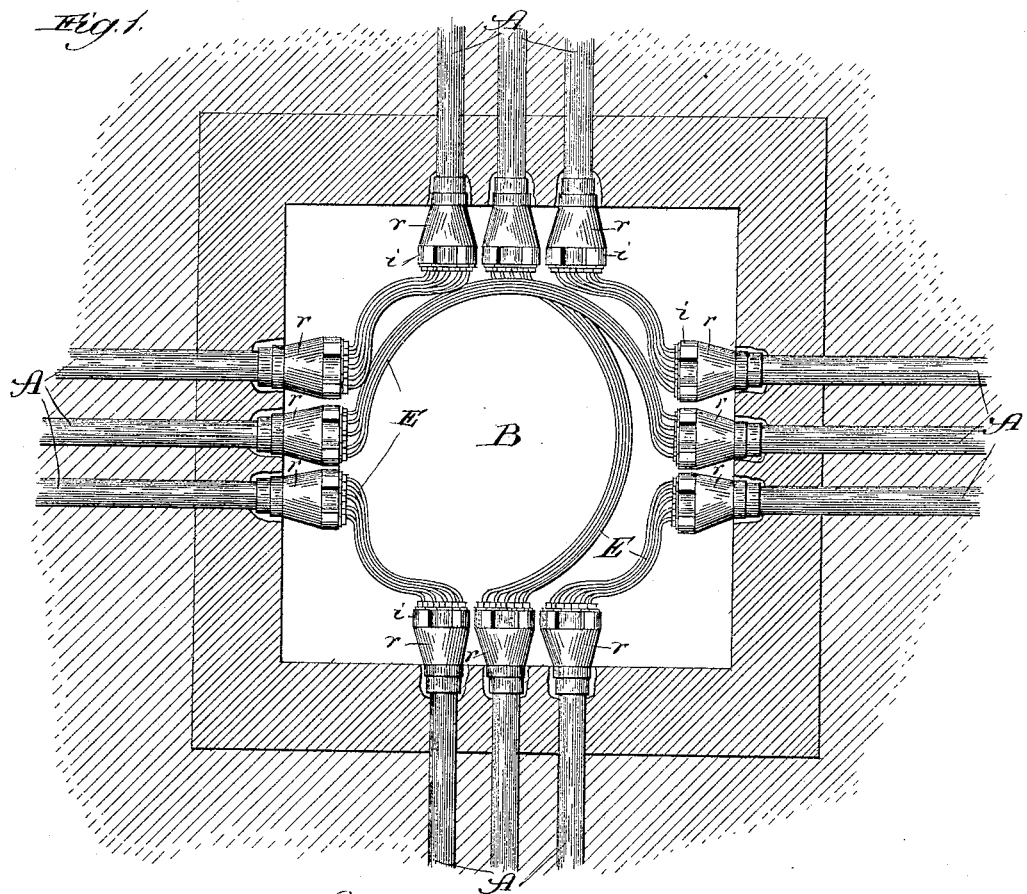
Figure 2:
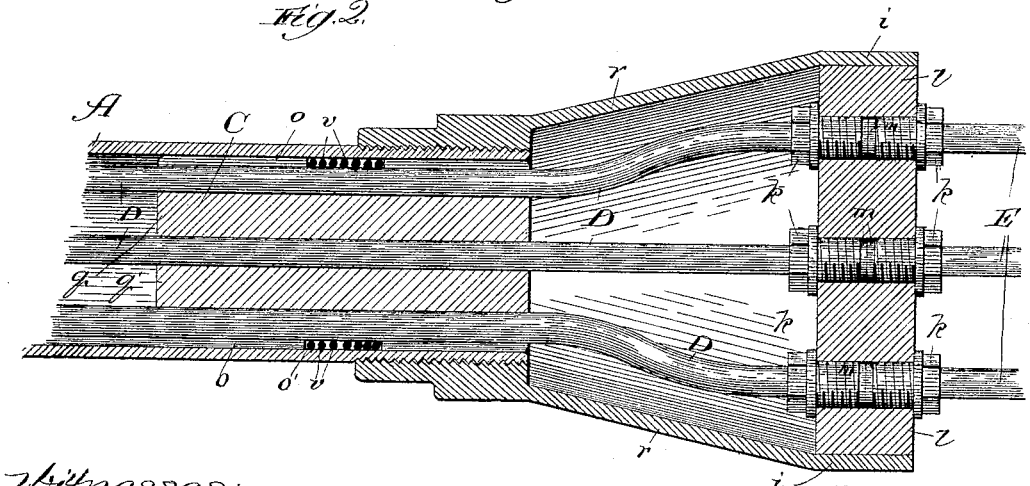

In the accompanying drawings, Figure 1 represents a horizontal section of a man-hole, showing pipe-conduits projecting into it from four sides and the conductors connected within it from conduits on different sides of the man-hole. Fig. 2 is an enlarged broken sectional view of an end of a pipe-conduit provided with the terminal enlargement or head, which projects into the man-hole and contains the perforated insulating-block, in which to produce the intercoupling of conductors and showing my improved device for facilitating the drawing of conductors into and supporting them within the pipe-conduit; Fig. 3, an end view of a pipe-conduit containing conductors. Figs. 4 and 5 are respectively an end and a side view of my improved device for facilitating the drawing in of the conductors. Fig. 6 is an enlarged broken sectional view of the block in the head of a pipe-conduit, showing the manner of and means for supporting and connecting conductors within its threaded perforations forming ferrules; Fig. 7, a perspective view showing my improved looping-box inserted into a pipe-conduit; Fig. 8, an enlarged longitudinal horizontal section of the means illustrated in Fig. 7; and Fig. 9, a plan sectional view of the loop portion of the box represented in Fig. 8, representing the circuit as led out of the box.

A A denote pipe-conduits, which are buried under ground to extend, preferably, near the curbs of the streets and between suitably-located man-holes B, into the walls of which they project at their ends, which I prefer to terminate with hollow enlarged heads $r$, which may be flaring, as shown, and are screwed upon the ends of the conduit-pipes in the walls of the man-holes, from which sufficient of the material of the walls is removed to permit the insertion of the heads.

C is my improved device for facilitating the drawing of the conductors into the underground pipe-conduits, and for centering and sustaining them therein. Its body is sufficiently long to afford good bearing, should conform to the shape of and fit the interior of the conduit with which it is used, and, as shown, (though it may be angular in cross-section,) it is shaped cylindrically and formed in two semi-cylindrical or substantially semi-cylindrical sections $q$ and $q'$, each provided with a semicircular groove, as shown, or more than one such groove along its center, whereby when the two parts are brought flatwise together they form one or more central orifices $p$, and the bisectional body C is also provided lengthwise in its outer surface with any desired number of grooves $o$, each adapted, like the central orifice $p$, to receive a conductor D. Obviously, however, the support C may be formed in a single piece. Midway between its extremities the support C is provided circumferentially with a groove $o'$, Fig 5.

While my improvement is adapted to be used with any suitable construction of conductor D, I prefer to form the latter of wire cable $n$, inclosed in tubing $n'$, of hard insulating material, as hard rubber, each terminating at its extremities in a metallic head $m$, this construction resembling that set forth in Letters Patent of the United States No. 429,307, granted me on the 3d day of June, 1890. As many as desired of the conductors are inserted into the grooves of a support C, (generally one in each groove,) and one is enveloped in each central orifice $p$, when, if the support be formed in separate sections, the two sections are bound together and the conductors in the grooves secured to it, as by means of cord $v$ or the like wound around the support in its circumferential groove $o'$. As many of the elongated supports C are provided at desired intervals along the conductors as are needed properly to support and maintain them apart inside a pipe-conduit, and they are readily drawn into the latter in the usual manner from one man-hole to another, owing to the guiding effect of the supports C. When the conductors have been thus laid in a pipe-conduit A, I introduce the opposite ends thereof, provided with the metallic contact-heads $m$, into the perforations of the blocks $l$, of insulating or insulated material, provided with internally-threaded perforations to receive the headed ends of the conductors, which are secured against withdrawal by means of the nuts $k$ (of insulating material, as hard rubber) introduced, as clearly shown in Fig. 2, into the perforations against the heads $m$ of the conductors. The blocks $l$ are then inserted into the expanded ends of the heads $r$ of the conduit-pipes and there secured by tightening the split collar extremities $i$, with which the heads $r$ are provided, Fig. 3, by means of a screw $w$ or screws working through flanges $w'$, extending from opposite sides of the slit in the collar.

When, as the result of the adjustment described of the conductors, they are in place, connection thereof in the man-holes from one pipe-conduit leading therein to another such may be readily accomplished by suitable couplers $e$, (see Figs. 1 and 2,) which may be formed like the conductors D, their heads $m$ being introduced through the perforations in the blocks $l$ into contact with the heads $m$ on the ends of the conductors D, and held by nuts $k$.

If desired, means may be provided in laying a pipe-conduit C for looping out the conductors at desired intervals, as at the houses along the route of the conduit to be supplied with current, or means for the purpose may be provided, after laying the pipe-conduit, as requirement therefor arises. The means I employ for the purpose comprise a box F, Figs. 7 and 8, which may be of metal, screwed or otherwise secured at its opposite ends upon the adjacent ends of severed sections of the pipe-conduit A and having a hollow nipple F', containing a perforated head $h$, which may be of wood or other insulating material, or of metal and cast integral with the box F, the top of which is provided with a cover $g$, screwed or otherwise removably fastened in place. The conductor (or conductors) to be looped out at a box F is there severed, the severed ends being preferably provided with contact-heads $m$ and inserted into the threaded perforations in the head $h$, wherein they are secured by insulating-nuts $k$, and if the looped conductor is not led immediately to the place (house) to be supplied with current the severed ends may be connected by a coupler G, formed like the conductor and with heads $m$ at its opposite ends, which are inserted through the perforations in the head $h$ against the metal heads $m$ of the severed conductor D, and therein secured by nuts $k$, and the coupler G is then protected by a cap H, screwed over the nipple F' and provided with openings in its end, closed by suitable plugs $f$, to be removed when the house connection is eventually made, as in the manner indicated in Fig. 9, and with openings for the securing-bolts $f'$.

What I claim as new, and desire to secure by Letters Patent, is—

1. In an underground-conduit system, the combination of a conduit, conductors in the conduit, and supports C, spacing the conductors and having the conductors secured to them independently of the conduit environment, the said supports being provided at intervals along the conductors and being movably supported in the conduit, substantially as described.

2. A support C for electric conductors in underground-conduit systems, comprising a body provided at intervals around its exterior surface with longitudinal grooves $o$ to receive the conductors and having a circumferential groove $o'$ to receive a binding medium $v$, substantially as described.

3. In combination, an underground conduit for electric conductors and a support C in the conduit, provided at intervals around its exterior surface with longitudinal grooves $o$ and having a circumferential groove $o'$ and a longitudinal central orifice $p$, and conductors in the grooves $o$ and orifice $p$ and fastened to the support by a binding medium $v$ in the groove $o'$, substantially as described.

4. In an underground-conduit system for electric conductors, a conduit A, extending between man-holes and having expanded heads $r$ projecting into the man-holes and provided with split collars $i$, means, substantially as described, for tightening the collars, and perforated blocks $l$, confined by the split collars to receive and retain the ends of conductors D, substantially as set forth.

5. In an underground-conduit system for electric conductors, a conduit A, extending between man-holes and having inserted into it a coupling-box F, provided with a nipple F', containing a perforated bearing-head $h$, a conductor D, supported at its ends in the head $h$, a coupler G for the said ends, and a cap H on the nipple, substantially as and for the purpose set forth.

HENRY B. COBB.

In presence of—
J. W. DYRENFORTH,
M. J. FROST.